(12) United States Patent
Keinert et al.

(10) Patent No.: US 7,962,877 B2
(45) Date of Patent: Jun. 14, 2011

(54) PORT ASSIGNMENT IN HIERARCHICAL DESIGNS BY ABSTRACTING MACRO LOGIC

(75) Inventors: Joachim Keinert, Altdorf (DE);
Juergen Koehl, Weil im Schoenbuch (DE); Thomas Ludwig, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/185,943

(22) Filed: Aug. 5, 2008

(65) Prior Publication Data

US 2010/0037198 A1 Feb. 11, 2010

(51) Int. Cl.
*G06F 17/50* (2006.01)
(52) U.S. Cl. .......... 716/119; 716/129; 716/130
(58) Field of Classification Search .......... 716/2, 13, 716/14, 9, 10, 119, 129, 130
See application file for complete search history.

(56) References Cited

U.S. PATENT DOCUMENTS

| | | | | |
|---|---|---|---|---|
| 6,086,625 | A * | 7/2000 | Shouen | 716/1 |
| 6,463,576 | B1 * | 10/2002 | Tomoda | 716/17 |
| 7,398,506 | B2 * | 7/2008 | Kanamoto et al. | 716/18 |
| 7,469,399 | B2 * | 12/2008 | Berry et al. | 716/10 |
| 2004/0205681 | A1 * | 10/2004 | Nozuyama | 716/4 |
| 2007/0067751 | A1 * | 3/2007 | Seno | 716/13 |
| 2008/0066039 | A1 * | 3/2008 | Berry et al. | 716/10 |
| 2008/0134120 | A1 * | 6/2008 | Wang et al. | 716/10 |
| 2008/0270967 | A1 * | 10/2008 | Kanamoto et al. | 716/12 |
| 2010/0077371 | A1 * | 3/2010 | Kobayashi | 716/8 |

OTHER PUBLICATIONS

IBM Corporation; Electronic Design Automation; Chip-Bench User's Guide, Forty-Fifth Edition (Apr. 2002); Copyright International Business Machines Corporation 1994, 2002.
Jurjen Westra et al., Towards Integration of Quadratic Placement and Pin Assignment; Proceedings of the IEEE Computer Society Annual Symposium on VLSI; New Frontiers in VLSI Design; Copyright 2005 IEEE.

* cited by examiner

*Primary Examiner* — Phallaka Kik
(74) *Attorney, Agent, or Firm* — Cantor Colburn LLP; John Campbell

(57) ABSTRACT

A method to reduce the problem complexity maintains a relatively high quality port assignment by abstracting local connections in the macro when performing the port assignment. This is done for netlength, congestion as well as timing. The internal netlist of the macro is abstracted in such a way that the optimization of the external interconnect can be done in an efficient manner. Three levels of abstractions are described. A first level optimizes the top level interconnect, a second level optimizes the top level and macro interconnects, while a third level optimizes the top level timing.

20 Claims, 11 Drawing Sheets

Enforcing port ordering

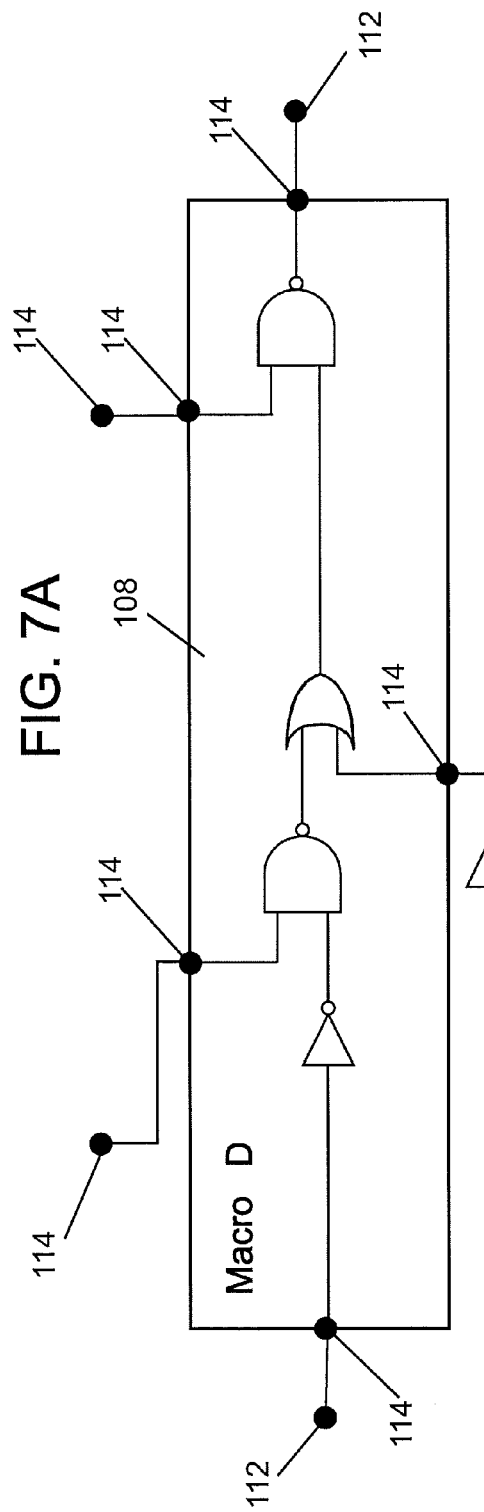
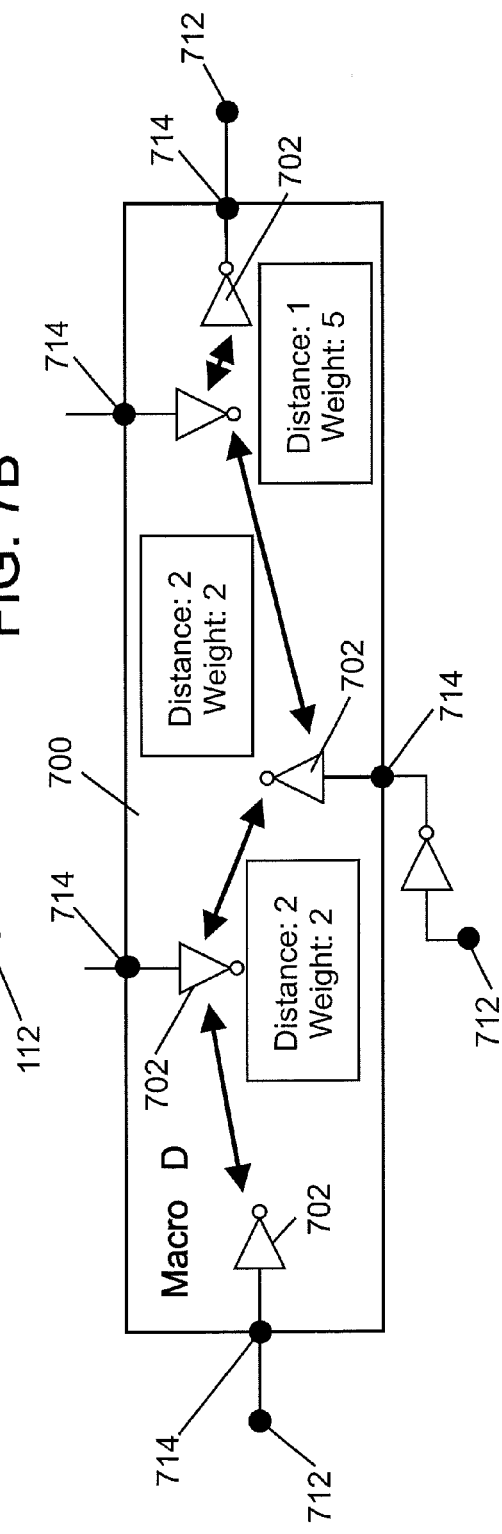
FIG. 7A
FIG. 7B

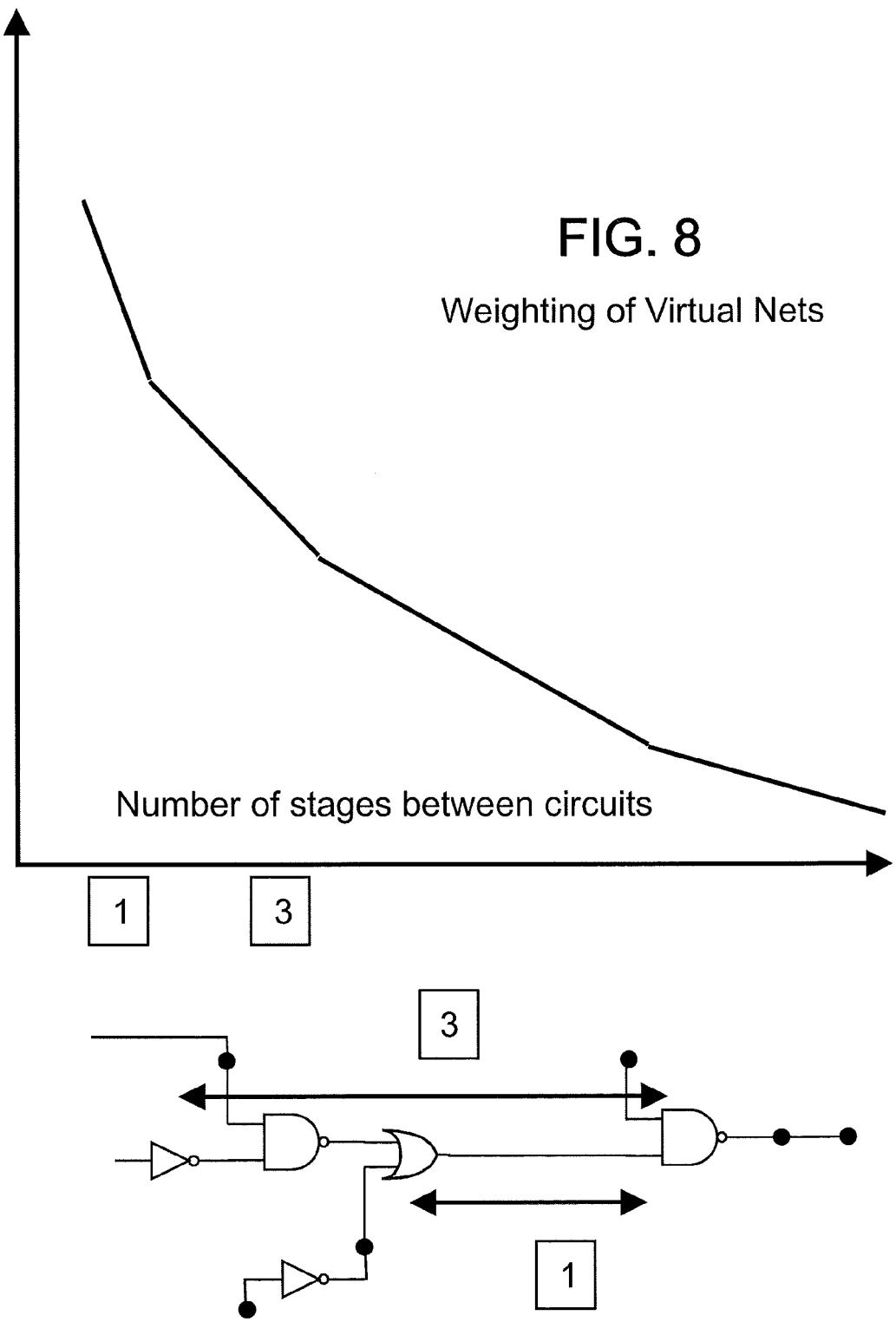

PORT ASSIGNMENT IN HIERARCHICAL DESIGNS BY ABSTRACTING MACRO LOGIC

BACKGROUND

The present invention relates to the placement and routing of electronic circuit designs for integrated circuits, and, more specifically, to an improved port assignment in hierarchical integrated circuit designs by abstracting macro logic.

In a hierarchical design approach, the logic of an integrated circuit ("IC") or chip is partitioned into smaller portions that are assigned to predefined areas of the chip. These smaller design portions (which may comprise area, logic, interconnects and timing assertions) are typically referred to as macros. Usually, some logic will not be assigned to any macro. This logic is considered as being on the top level of the hierarchy. It may well be that the hierarchy is nested and a chip is partitioned into one or more units and each unit is partitioned into one or more macros. The top level is typically referred to as a "unit" and the lower level(s) as "macros".

A port of a macro is the point (or small area) at which the internal and external signals are connected to each other. Port assignment of macros is in general important for the quality of the resulting layout. A relatively good port assignment may be achieved if a flat placement step optimizing netlength, congestion and/or timing that restrict the logic assigned to each macro to the designated area is followed by a detailed routing step. The ports are then the points where the external net enters the area assigned to the macro logic. This optimization considers global as well as local information.

However this approach has to deal with the entire complexity of the unit and thus comprises relatively considerable effort in run time and memory, contrary to the "divide and conquer" concept of hierarchy. Typically the vast majority of nets and circuits are inside the macros. Another problem is that in the early phases of the design process the internal logic of macros may not be designed yet. There may only be some guidelines in existence as to which ports are to be close to each other.

BRIEF SUMMARY

According to an embodiment of the invention, a method to reduce the problem complexity maintains a relatively high quality port assignment by abstracting local connections in the macro when performing the port assignment. This is done for netlength, congestion as well as timing. The internal netlist of the macro is abstracted in such a way that the optimization of the external interconnect can be done in an efficient manner. Three levels of abstractions are described. A first level optimizes the top level interconnect, a second level optimizes the top level and macro interconnects, while a third level optimizes the top level timing.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

FIG. 7, including FIGS. 7A and 7B, illustrates the distance and weight assigned to the connection between virtual inverters within a macro of FIG. 4;

FIG. 8 illustrates an example of the weighting of the virtual nets of FIG. 7;

DETAILED DESCRIPTION

Figure 1:
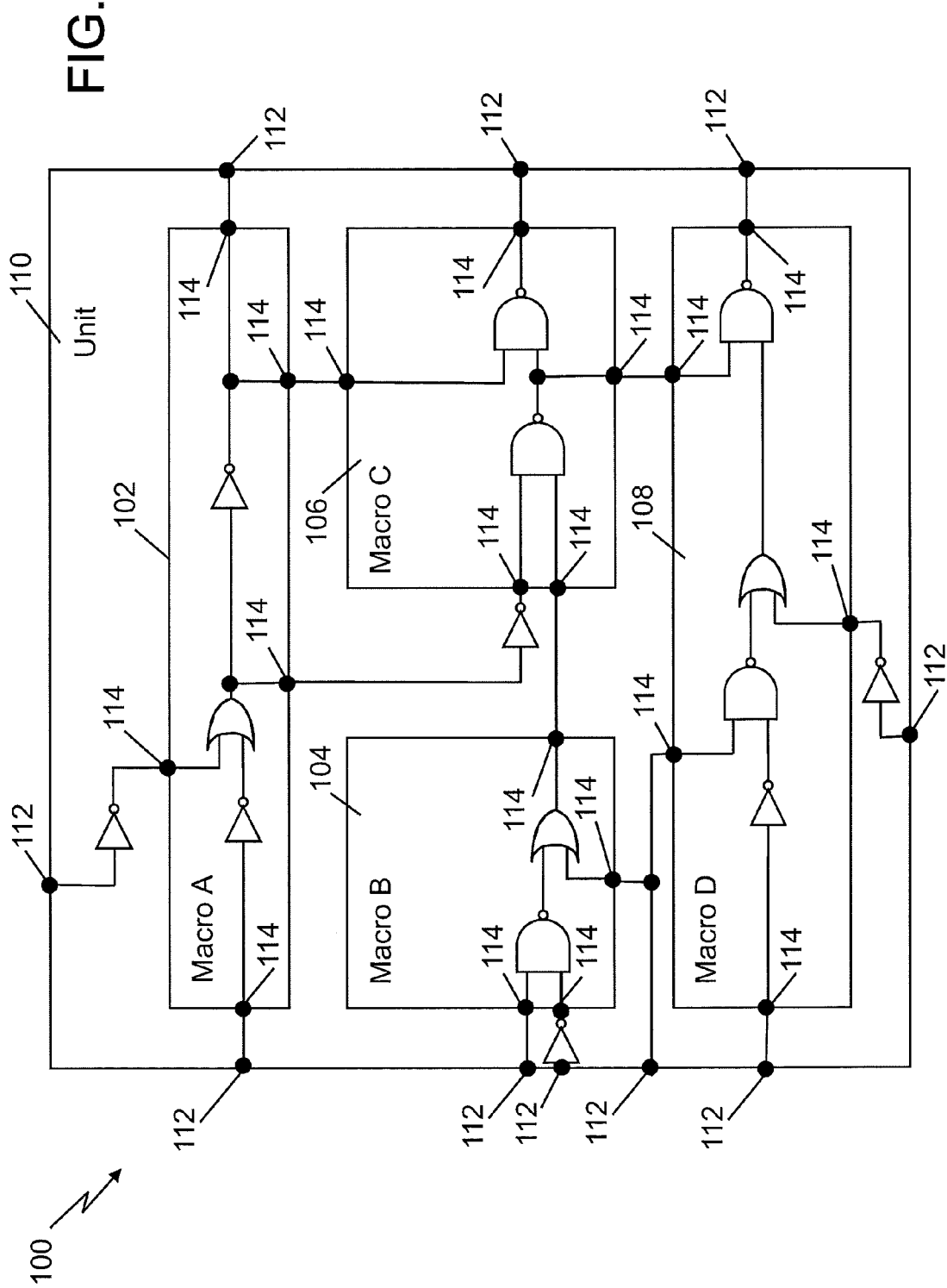
FIG. 1 is a block diagram of an IC or chip having a top level unit and several lower level macros.

Referring to the block diagram of FIG. 1, in a hierarchical design approach, the logic of an IC or chip 100 is partitioned into smaller portions that are assigned to predefined areas of the chip. These smaller design portions (which may comprise area, logic, interconnects, timing assertions, etc.) are typically referred to as macros. Four macros ("Macro A"-"Macro D") 102-108 are illustrated in FIG. 1, wherein each macro 102-108 is shown containing various combinational logic circuits or components. The macros 102-108 also may contain sequential logic. Usually, some logic will not be assigned to any macro. This logic is considered as being on the top level of the hierarchy. It may well be that the hierarchy is nested and a chip is partitioned into one or more units and each unit is partitioned into one or more macros. The top level is typically referred to as a "unit" and the lower level(s) as "macros". One unit 110 is illustrated in FIG. 1. Also illustrated is a plurality of input/output ports or pins 112 for the unit or chip and a plurality of ports 114 for the various macros 102-108.

An embodiment of the present invention comprises a method for reducing the problem complexity of the prior art methods while still maintaining a relatively high quality solution to port assignment by abstracting local connections in the macro when performing port assignment for the macro. This is done for netlength, congestion as well as timing. Specifically the internal netlist of the macro is abstracted such that the optimization of the port connections can be performed in a relatively efficient manner. Three levels of abstractions are disclosed.

Figure 2:
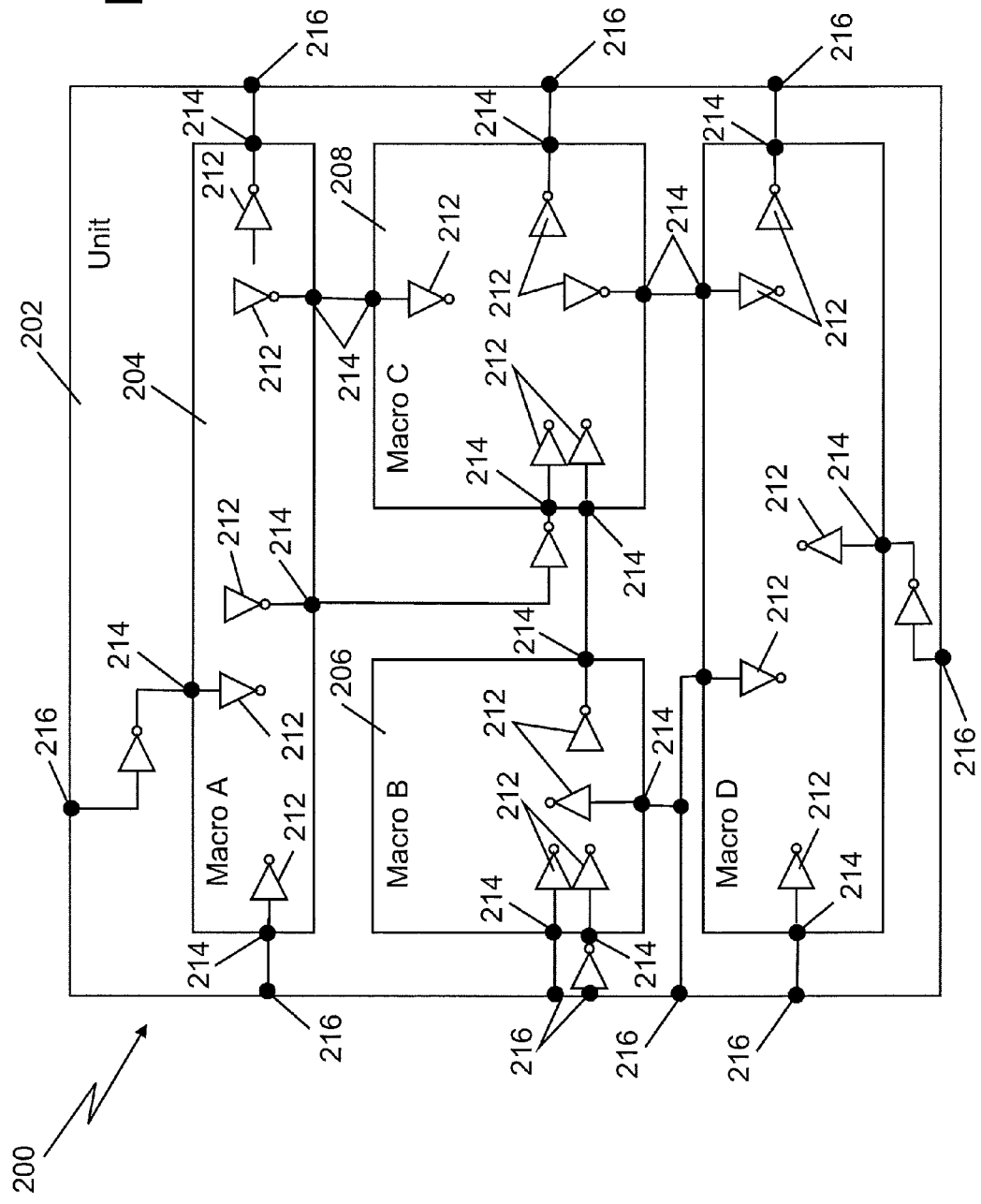
FIG. 2 is a block diagram of an IC or chip having a top level unit and several lower level macros with port assignments in accordance with a first abstraction of an embodiment of the invention.

Referring to FIG. 2, there illustrated is a block diagram an IC or chip 200 having a top level unit 202 and several lower level macros 204-210 with port assignments in accordance with a first abstraction of an embodiment of the invention. Each input and output circuit (FIG. 1) for each macro 204-210 is replaced by a circuit component which, in an embodiment, comprises an inverter circuit 212. However, the circuit components 212 may, in the alternative, comprise a buffer, a terminator, or a load book. The port assignment process now comprises placing or locating the entire logic (i.e., the unit 202 and the inverters 212 or other components in each of the macros 204-210) such that netlength and congestion are both minimized. Thus, this first abstraction of an embodiment of the invention optimizes the top level interconnect. The area or point where the signal wire enters or leaves the macro 204-210 is where the port location 214 is assigned for each macro 204-210. Also illustrated is a plurality of input/output ports or pins 216 for the unit or chip 202.

Figure 3:
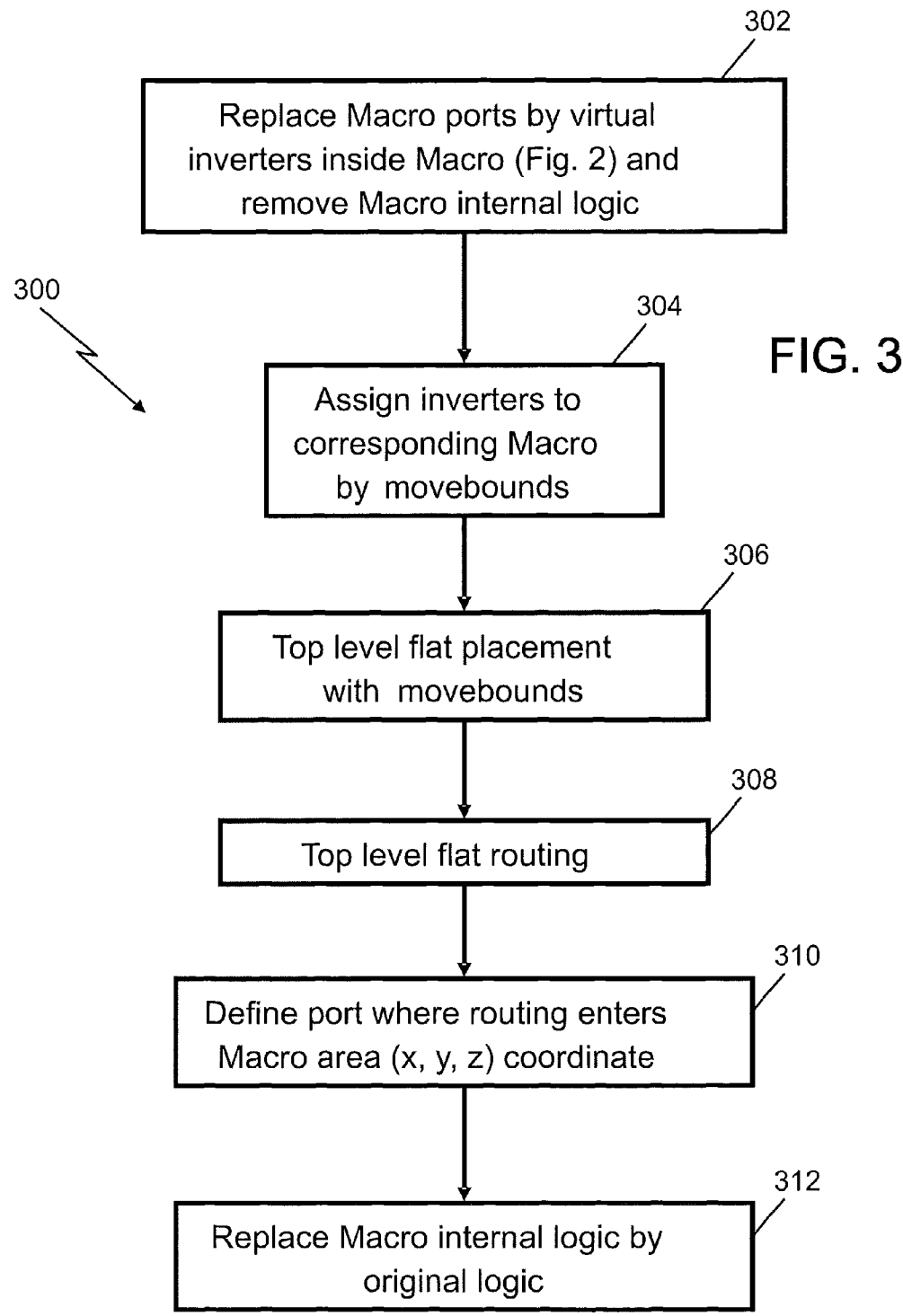
FIG. 3 is a flow diagram of the steps in a method for the first abstraction of FIG. 2 in an embodiment of the invention in which the top level interconnects are optimized.

The flow diagram of FIG. 3 illustrates the steps in a method 300 for the first abstraction of an embodiment of the invention in which the top level interconnects are optimized. In the method 300 of FIG. 3, in a step 302 the macro ports are replaced by the virtual inverters 212 (FIG. 2) inside each macro 204-210. Also, the internal logic within each macro 204-210 (FIG. 1) is removed. The inverters 212 are then assigned to the corresponding macros 204-210 by movebounds in a step 304. Next, a flat placement of the entire abstracted logic with movebounds is carried out in a step 306, and then the top level flat routing occurs in a step 308. Then, a step 310 takes place which defines the ports where routing enters the macro area in x, y, z coordinates. Next, the macro internal logic is replaced in a step 312 by the original macro logic.

Figure 4:
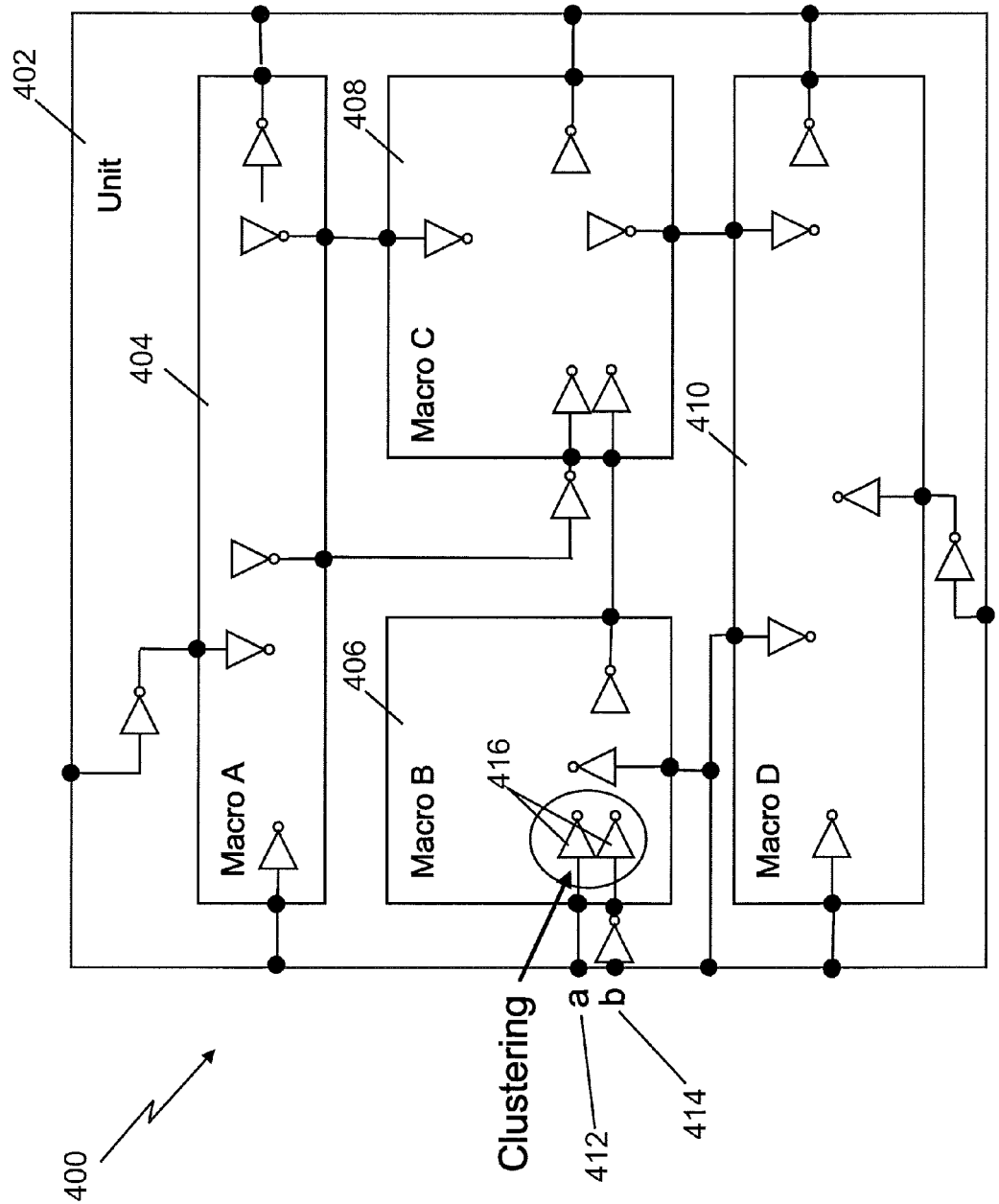
FIG. 4 is a block diagram of a second abstraction of an embodiment of the invention.
Figure 5:
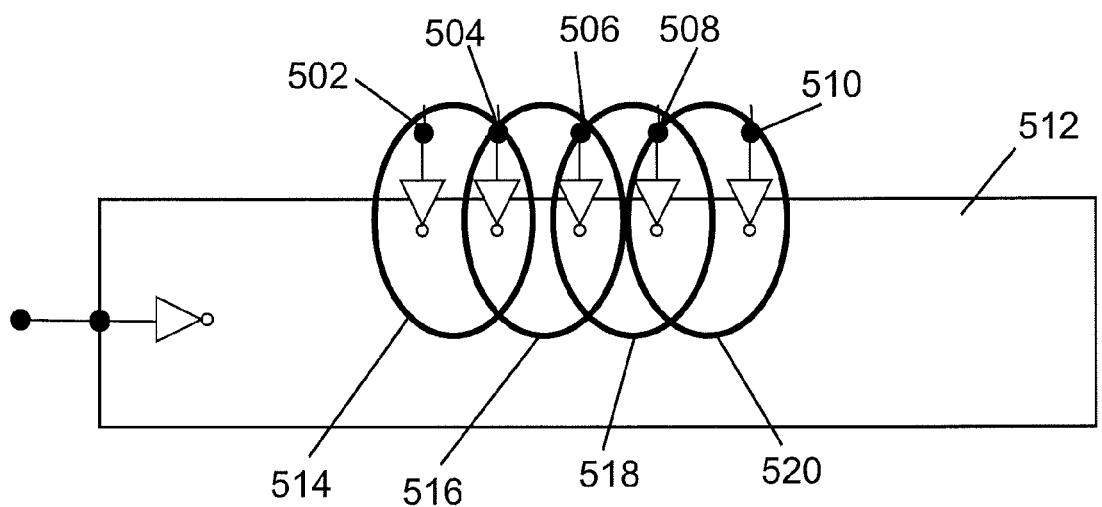
FIG. 5 illustrates a clustering approach of splitting a sequence of n ports within a macro into n−1 pair-wise clusters of ports.

Referring to FIG. 4, there illustrated is a block diagram of an IC 400 having a top level unit 402 and several lower level macros 404-410 with port assignments in accordance with a second abstraction of an embodiment of the invention. The first abstraction of FIG. 2 does not consider the fact that port (a) 412 and port (b) 414 in FIG. 4 may be located relatively close to each other as these two ports 412-414 are connected to the same circuit within Macro B 406. This can be handled by any clustering method during the placement step. A typical clustering method is to add a new artificial connection between the two inverters 416 connected to port (a) 412 and port (b) 414. Also, a relatively high weight may be placed on the connection (e.g., a weight of 10 means that the placement minimizing the overall netlength weights this connection 10 times higher than a connection or net without a special weight assigned). These connections may either be: (1) given by the logic designer, for example, to cluster multiple-bit signal busses, which is the case when the macro logic is not available yet; or (2) derived from a previous logic analysis step of all the RLMs counting how many circuits are in between the two ports 412-414, where in general, the lower this number the higher the weight to be chosen. The clustering approach may also be used to guide the port assignment to a certain sequencing of the ports. In these cases the relative ordering is important but mirroring may be allowed to optimize the global connections. This may be obtained by splitting a sequence of n ports 502-510 within a macro 512 into n–1 pair-wise clusters 514-520 of ports as shown in FIG. 5.

Figure 6:
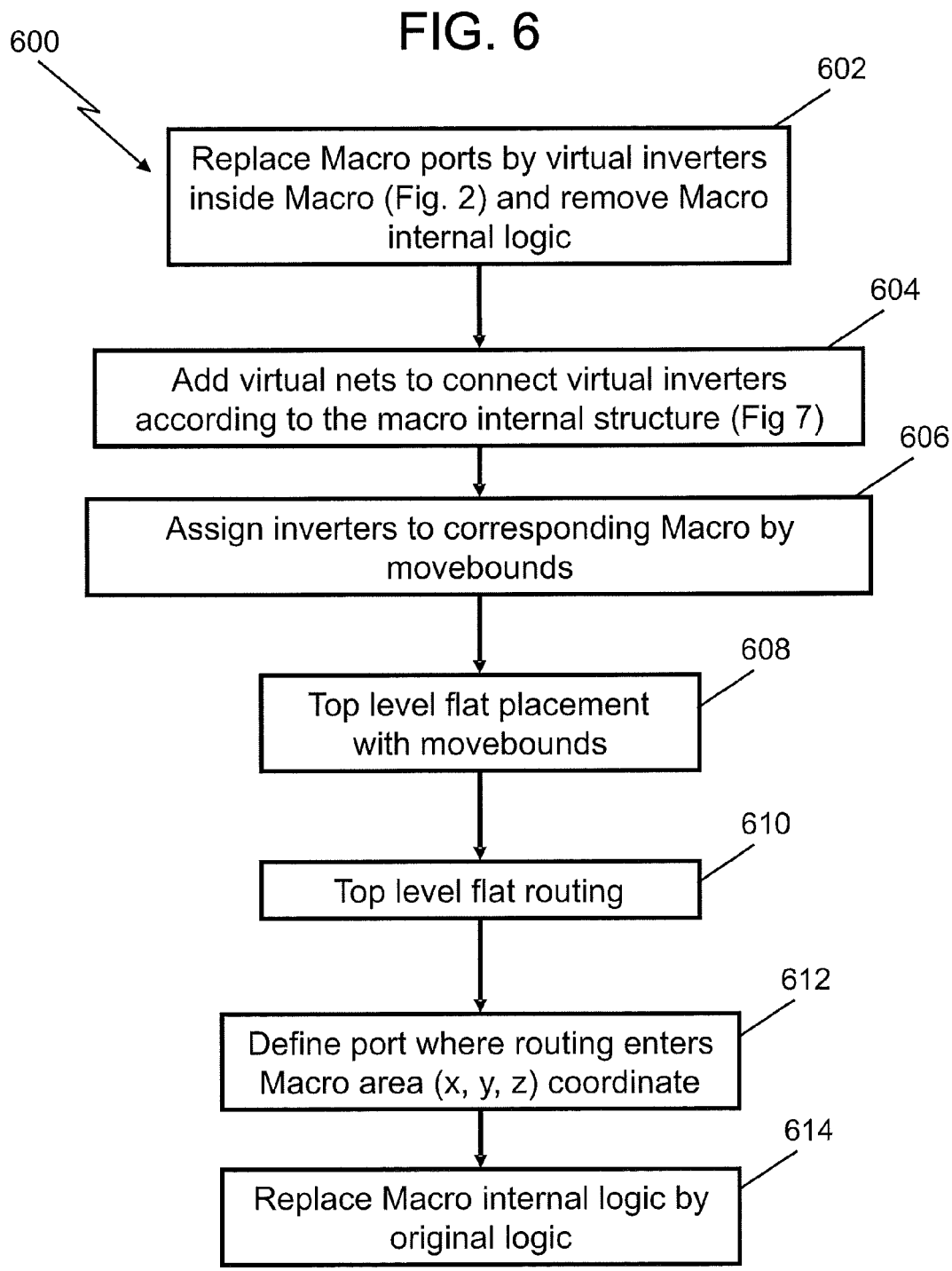
FIG. 6 is a flow diagram of the steps in a method for the second abstraction of FIG. 4 in an embodiment of the invention in which both the top level and the macro interconnects are optimized.

The flow diagram of FIG. 6 illustrates the steps in a method 600 for the second abstraction of an embodiment of the invention in which both the top level interconnects and the macro interconnects are optimized. The method 600 of FIG. 6 is similar to the method 300 of FIG. 3, with the exception of the addition of a step 604 in which virtual nets are added to connect the virtual inverters according to the macro internal structure. For example, see FIG. 7 in which Macro D 108 from FIG. 1 is shown in FIG. 7A above the abstracted Macro D 700 in FIG. 7B in which the virtual inverters 702 or other components within Macro D 700 have a distance and a weight assigned to the connection between these inverters 702. An example of the weighting of the virtual nets is illustrated in FIG. 8. This figure illustrates that the weighting is typically given by the number of stages (i.e., distance) between ports of a macro.

Figure 9:
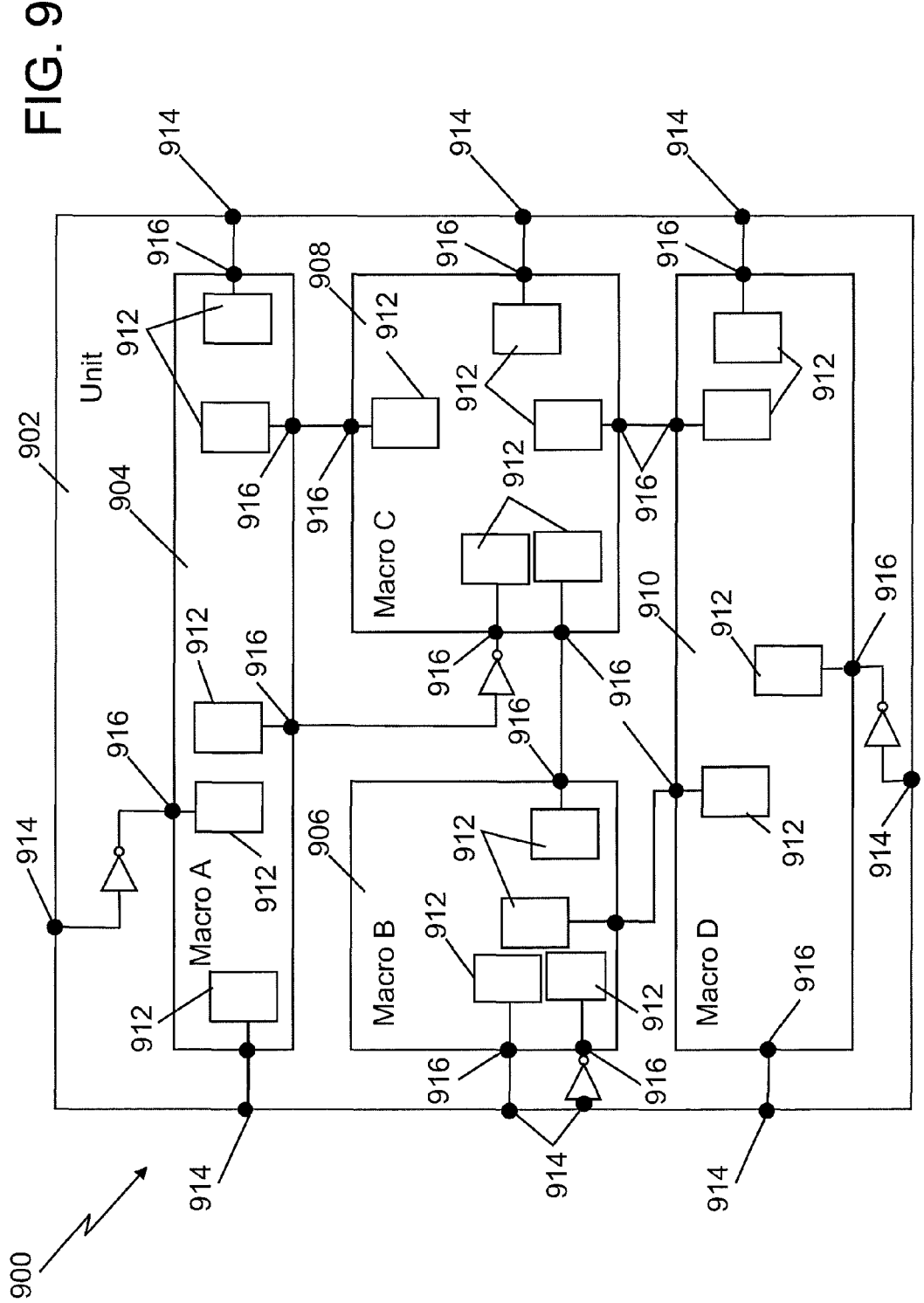
FIG. 9 is a block diagram of a third abstraction of an embodiment of the invention.

Referring to FIG. 9, there illustrated is a block diagram of an IC 900 having a top level unit 902 and several lower level macros 904-910 with port assignments in accordance with a third abstraction of an embodiment of the invention. The first and second abstractions described hereinabove do not permit timing-driven optimization port assignment. This is because the removal of the macro logic breaks the timing paths as seen by static timing analysis ("STA") or similar tools. A standard design practice is to latch-bound macros for high frequency designs. Within this abstraction the inverters utilized within the first and second abstractions may be replaced by clocked latches or flip-flops 912, which connect to clock signals such that STA tools can now time between the unit (or chip) input/output ports 914 and the macros. Each timing path starts and ends at either an input/output port or pin 914 or a latch 912. Clock overrides may be used to account for logic stages between the latches 912 and the ports 916 that exist in the real logic of the macro 904-910.

Figure 10:
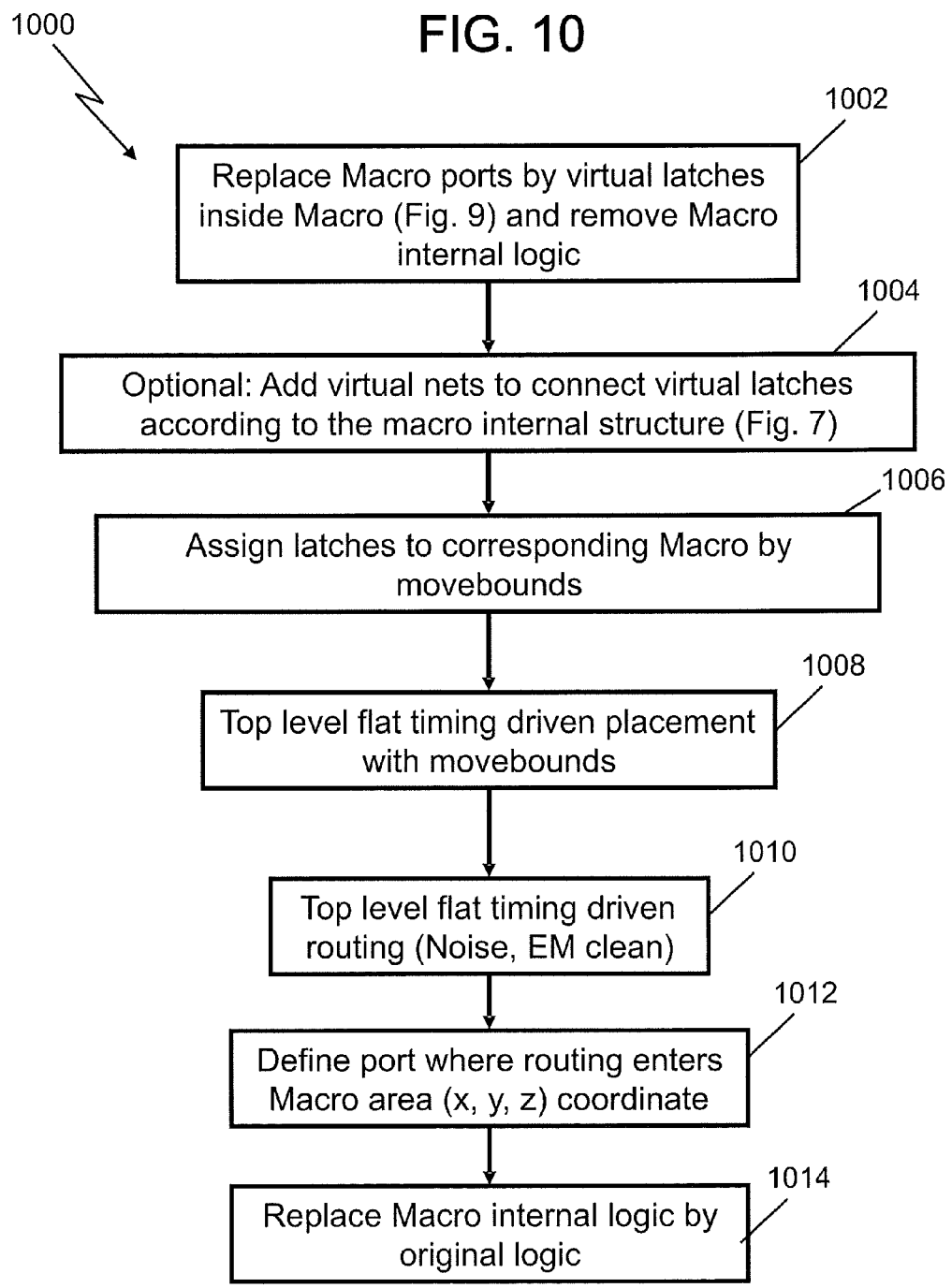
FIG. 10 is a flow diagram of the steps in a method for the third abstraction of FIG. 9 in an embodiment of the invention in which the top level timing is optimized.

The flow diagram of FIG. 10 illustrates the steps in a method 1000 for the third abstraction of an embodiment of the invention in which the top level timing is optimized. In the method 1000 of FIG. 10, in a step 1002 the macro ports are replaced by the virtual latches 912 (FIG. 9) inside each macro 904-910. Also, the internal logic within each macro 904-910 (FIG. 1) is removed. In an optional step 1004, the virtual nets are added to connect the virtual latches 912 according to the macro internal structure (FIG. 7). The latches 912 are then assigned to the corresponding macros 904-910 by movebounds in a step 1006. Next, a flat timing driven placement of the entire abstracted logic with movebounds is carried out in a step 1008, and then the top level flat timing driven routing occurs in a step 1010. Then, a step 1012 takes place which defines the ports where routing enters the macro area in x, y, z coordinates. Next, the macro internal logic is replaced in a step 1014 by the original macro logic.

Figure 11:
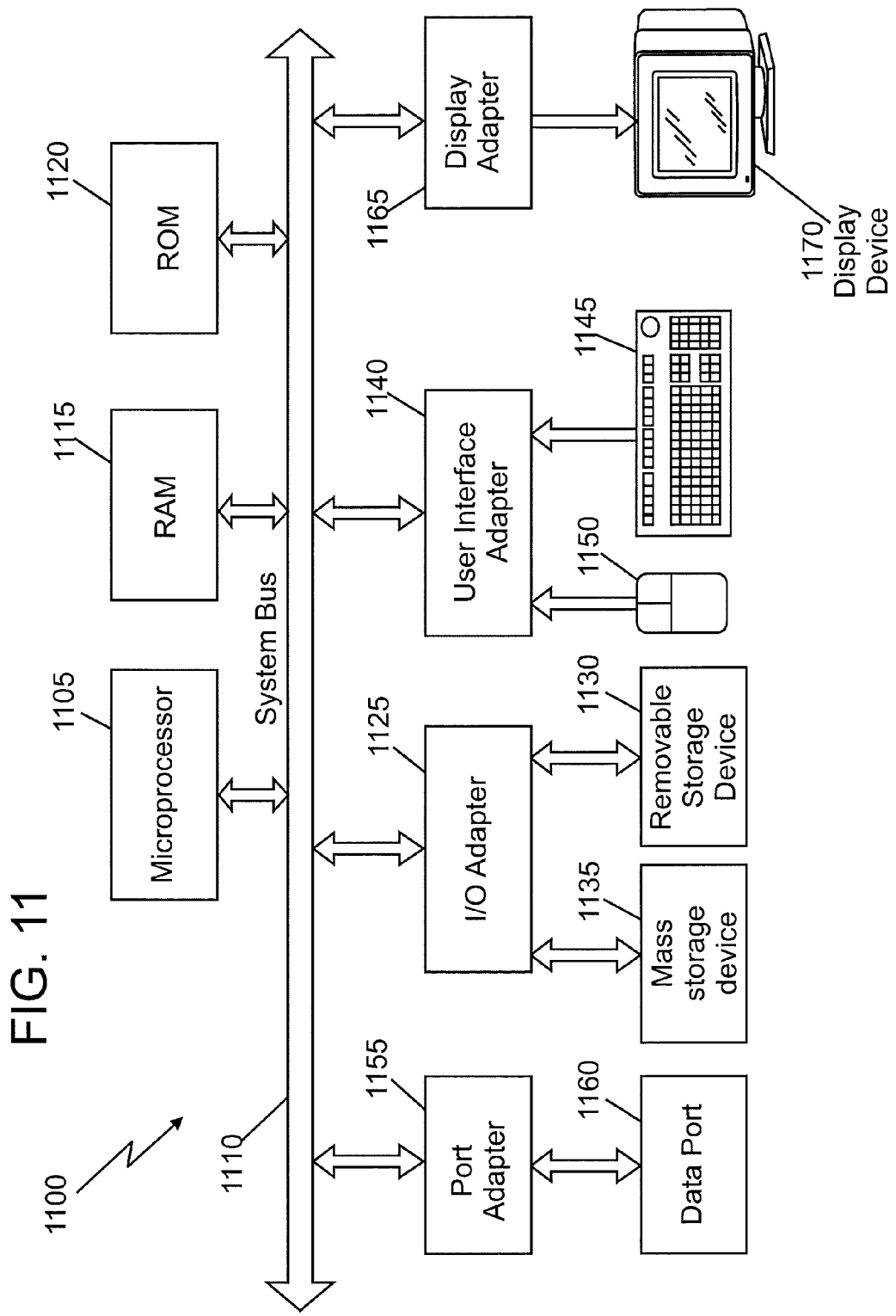
FIG. 11 is a schematic block diagram of a general-purpose computer suitable for practicing embodiments of the present invention.

Generally, the method embodiments disclosed herein may be practiced with a general-purpose computer and the method embodiments may be coded as a set of instructions on removable or hard media for use by the general-purpose computer. FIG. 11 is a schematic block diagram of a general-purpose computer suitable for practicing embodiments of the present invention. In FIG. 11, computer system 1100 has at least one microprocessor or central processing unit (CPU) 1105. CPU 1105 is interconnected via a system bus 1110 to a random access memory (RAM) 1115, a read-only memory (ROM) 1120, an input/output (I/O) adapter 1125 for connecting a removable data and/or program storage device 1130 and a mass data and/or program storage device 1135, a user interface adapter 1140 for connecting a keyboard 1145 and a mouse 1150, a port adapter 1155 for connecting a data port 1160 and a display adapter 1165 for connecting a display device 1170.

ROM 1120 contains the basic operating system for computer system 1100. The operating system may alternatively reside in RAM 1115 or elsewhere as is known in the art. Examples of removable data and/or program storage device 1130 include magnetic media such as floppy drives and tape drives and optical media such as CD ROM drives. Examples of mass data and/or program storage device 1135 include hard disk drives and non-volatile memory such as flash memory. In addition to keyboard 1145 and mouse 1150, other user input devices such as trackballs, writing tablets, pressure pads, microphones, light pens and position-sensing screen displays may be connected to user interface 1140. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 1130, fed through data port 1160 or typed in using keyboard 1145.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the embodiments of the method described above and illustrated in FIGS. 3, 6 and 10.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for abstracting a plurality of local connections in a macro portion of an integrated circuit, comprising:
   using a computer processor to perform the following:
   replacing each of a plurality of ports within the macro portion with a corresponding one of a plurality of virtual circuit components;
   removing any internal logic from within the macro portion;
   assigning the plurality of virtual circuit components to the macro portion by movebounds to create abstracted logic within the macro portion;
   carrying out a flat placement of the abstracted logic with movebounds;
   carrying out a top level flat routing;
   defining each of the plurality of ports within the macro portion where routing enters the macro portion; and
   replacing internal logic of the macro portion by original logic of the macro portion.

2. The method of claim 1, wherein defining each of the plurality of ports where routing enters the macro portion occurs in x, y, z coordinates.

3. The method of claim 1, wherein the original logic of the macro portion includes combinational logic or sequential logic, and wherein the plurality of virtual components includes an inverter, a buffer, a terminator, or a load book.

4. The method of claim 1, further comprising adding a plurality of virtual nets to connect together the plurality of virtual circuit components.

5. The method of claim 4, wherein the plurality of virtual circuit components are connected according to an internal structure of the macro portion.

6. The method of claim 4, wherein the plurality of virtual circuit components are connected according to a distance between the corresponding ports.

7. The method of claim 6, wherein a weight is assigned to the distance between the corresponding ports.

8. A computer program product including a non-transitory computer-readable storage medium having computer-executable program instructions stored thereon, that, when processed by a computer, cause the computer to implement a method for abstracting a plurality of local connections in a macro portion of an integrated circuit, said method comprising:
   replacing each of a plurality of ports within the macro portion with a corresponding one of a plurality of virtual circuit components;
   removing any internal logic from within the macro portion;
   assigning the plurality of virtual circuit components to the macro portion by movebounds to create abstracted logic within the macro portion;
   carrying out a flat placement of the abstracted logic with movebounds;

carrying out a top level flat routing;

defining each of the plurality of ports within the macro portion where routing enters the macro portion; and replacing internal logic of the macro portion by original logic of the macro portion.

9. The computer program product of claim 8, wherein defining each of the plurality of ports where routing enters the macro portion occurs in x, y, z coordinates.

10. The computer program product of claim 8, wherein the original logic of the macro portion includes combinational logic or sequential logic, and wherein the plurality of virtual circuit components includes an inverter, a buffer, a terminator, or a load book.

11. The computer program product of claim 8, the method further comprising adding a plurality of virtual nets to connect together the plurality of virtual circuit components.

12. The computer program product of claim 11, wherein the plurality of virtual circuit components are connected according to an internal structure of the macro portion.

13. The computer program product of claim 11, wherein the plurality of virtual circuit components are connected according to a distance between the corresponding ports.

14. The computer program product of claim 13, wherein a weight is assigned to the distance between the corresponding ports.

15. A computer-implemented method for abstracting a plurality of local connections in a macro portion of an integrated circuit, comprising:

using a computer processor to perform the following:

replacing each of a plurality of ports within the macro portion with a corresponding one of a plurality of virtual latches;

removing any internal logic from within the macro portion;

assigning the plurality of virtual latches to the macro portion by movebounds to create abstracted logic within the macro portion;

carrying out a flat timing driven placement of the abstracted logic with movebounds;

carrying out a top level flat timing driven routing;

defining each of the plurality of ports within the macro portion where routing enters the macro portion; and replacing internal logic of the macro portion by original logic of the macro portion.

16. The method of claim 15, wherein defining each of the plurality of ports where routing enters the macro portion occurs in x, y, z coordinates.

17. The method of claim 15, further comprising adding a plurality of virtual nets to connect together the plurality of virtual latches.

18. The method of claim 17, wherein the plurality of virtual latches are connected according to an internal structure of the macro portion.

19. The method of claim 17, wherein the plurality of virtual latches are connected according to a distance between the corresponding ports.

20. The method of claim 19, wherein a weight is assigned to the distance between the corresponding ports.

* * * * *